United States Patent
Andgart et al.

(10) Patent No.: US 9,100,902 B2
(45) Date of Patent: Aug. 4, 2015

(54) FINDING CARRIERS IN A RADIO COMMUNICATION NETWORK

(75) Inventors: Niklas Andgart, Södra Sandby (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 312 days.

(21) Appl. No.: 13/580,566

(22) PCT Filed: Feb. 24, 2010

(86) PCT No.: PCT/SE2010/050214
§ 371 (c)(1),
(2), (4) Date: Aug. 22, 2012

(87) PCT Pub. No.: WO2011/105940
PCT Pub. Date: Sep. 1, 2011

(65) Prior Publication Data
US 2012/0315941 A1    Dec. 13, 2012

(51) Int. Cl.
*H04B 7/00*     (2006.01)
*H04W 48/16*    (2009.01)
*H04W 76/04*    (2009.01)

(52) U.S. Cl.
CPC ............ *H04W 48/16* (2013.01); *H04W 76/048* (2013.01)

(58) Field of Classification Search
USPC ............ 455/509, 41.1, 9, 500, 502, 510, 515, 455/62; 370/242, 254, 329, 347, 362; 714/707, 731, 744
See application file for complete search history.

(56) References Cited

U.S. PATENT DOCUMENTS

| | | | |
|---|---|---|---|
| 8,711,709 B2 * | 4/2014 | Marinier et al. | 370/242 |
| 2001/0046861 A1 | 11/2001 | Attimont et al. | |
| 2003/0026242 A1 | 2/2003 | Jokinen et al. | |

(Continued)

FOREIGN PATENT DOCUMENTS

| | | |
|---|---|---|
| JP | 10174158 A | 6/1998 |
| JP | 2004289226 A | 10/2004 |

(Continued)

OTHER PUBLICATIONS

Fujii, M. "Cell Search Scheme Embedded with Carrier Frequency Synchronization in Broadband OFDM-CDM Systems." IEEE Global Telecommunications Conference, 2002 (GLOBECOM '02), vol. 1, Nov. 17-21, 2002, pp. 238-243.

*Primary Examiner* — Junpeng Chen
(74) *Attorney, Agent, or Firm* — Murphy, Bilak & Homiller, PLLC

(57) ABSTRACT

A mobile station comprises a radio communication unit (22) for communicating with a radio communication network for finding carriers on which transmissions are being made in active transmission intervals of a transmission cycle following a discontinuous transmission scheme. The radio communication unit is configured to select a carrier based on probability settings provided for each carrier of the scheme, scan the selected carrier during a time range that is a fraction of the transmission cycle, confirm the presence of the carrier if transmissions are detected and otherwise to adjust the probability settings of the carriers based on the timing of the scanning and the position of the carrier active transmission interval in the transmission sequence and repeat the selection of carrier based on probability settings and adjusting of probability settings until the presence of a carrier has been confirmed.

15 Claims, 6 Drawing Sheets

(56) References Cited

U.S. PATENT DOCUMENTS

| | | | |
|---|---|---|---|
| 2012/0002643 A1* | 1/2012 | Chung et al. | 370/331 |
| 2012/0021792 A1* | 1/2012 | Shen et al. | 455/509 |
| 2012/0327927 A1* | 12/2012 | Wiatrowski et al. | 370/347 |

FOREIGN PATENT DOCUMENTS

| | | |
|---|---|---|
| JP | 2010035051 A1 | 2/2010 |
| WO | 2004/089015 A1 | 10/2004 |
| WO | 2009/147296 A1 | 12/2009 |

* cited by examiner

FINDING CARRIERS IN A RADIO COMMUNICATION NETWORK

TECHNICAL FIELD

The invention is concerned with finding of carriers in radio communication networks. More particularly, the invention relates to a method, a mobile station and a computer program product for finding carriers on which transmissions are being made in a part of a radio communication network.

BACKGROUND

Traditionally base stations or cells in wireless networks, such as cellular radio communication networks, have been transmitting continuously on some carriers, for instance on known broadcast carriers, i.e. on known and dedicated carrier frequencies.

In this way mobile stations have been able to determine which base stations or cells are in their neighbourhood through merely scanning all possible carriers and frequencies, detect data identifying the base station or cell in question and then connect to the network via the most suitable base station.

However, in future networks, such as future versions of LTE (Long Term Evolution) it is of interest for the base stations to be silent in a cell for long durations of time, typically much longer than the ordinary frame length used for ordinary communication.

This also makes it harder for mobile stations to locate such carriers and consequently also to connect to a radio communication network.

The present invention is directed towards improving on this situation, when base stations are silent during long periods of time.

SUMMARY

The invention is therefore directed towards reducing the time it takes for a mobile station to identify the presence of carriers, when the surrounding network is operating in a silent or low activity mode.

One object of the invention is therefore to provide a faster way of finding carriers on which transmissions are being made in a part of a radio communication network, when these signals are transmitted on carriers in active transmission intervals of a transmission cycle that follows a discontinuous transmission scheme.

This object is according to a first aspect of the invention achieved through a method, in a mobile station, for finding carriers on which transmissions are being made in a part of a radio communication network, when these signals are transmitted on carriers in active transmission intervals of a transmission cycle that follows a discontinuous transmission scheme. The discontinuous transmission scheme here specifies a transmission sequence of a set of carriers. In the method a carrier is selected based on probability settings provided for carriers of the scheme, scanned during a time range that is a fraction of the transmission cycle and then the presence of the carrier is confirmed if transmissions are detected on it. However if transmissions are not detected the probability settings of the carriers are adjusted based on the timing of the scanning and the position of the carrier active transmission interval in the transmission sequence. The selection of carrier based on probability settings and adjusting of probability settings are then repeated until the presence of a carrier has been confirmed.

The object is according to a second aspect of the invention achieved through a mobile station for finding carriers on which transmissions are being made in a part of a radio communication network, when these signals are transmitted on carriers in active transmission intervals of a transmission cycle that follows a discontinuous transmission scheme. The discontinuous transmission scheme here specifies a transmission sequence of a set of carriers. The mobile station comprises at least one radio communication unit for communicating with the network. This unit is configured to select a carrier based on probability settings provided for carriers of the scheme, scan the selected carrier during a time range that is a fraction of the transmission cycle and confirm the presence of the carrier if transmissions are detected on it. However, if such transmissions are not detected, the radio communication unit is configured to adjust the probability settings of the carriers based on the timing of the scanning and the position of the carrier active transmission interval in the transmission sequence and repeat selecting carrier based on probability settings and adjust probability settings until the presence of a carrier has been confirmed.

For this reason the radio communication unit may comprise a scanning module for selecting carrier, a measurement evaluation module for detecting transmissions and a carrier probability setting module for adjusting the probability settings of the carriers.

This object is according to a third aspect of the invention also achieved by a computer program product for making a mobile station find carriers on which transmissions are being made in a part of a radio communication network, when these signals are transmitted on carriers in active transmission intervals of a transmission cycle that follows a discontinuous transmission scheme. The discontinuous transmission scheme here specifies a transmission sequence of a set of carriers. The computer program product comprises computer program code which when run in the mobile station, causes the mobile station to select a carrier based on probability settings provided for carriers of the scheme, scan the selected carrier during a time range that is a fraction of the transmission cycle and confirm the presence of the carrier if transmissions are detected on it. However, in case such transmissions are not detected the computer program code causes the mobile station to adjust the probability settings of the carriers based on the timing of the scanning and the position of the carrier active transmission interval in the transmission sequence and repeat the selection of carrier based on probability settings and adjust probability settings until the presence of a carrier has been identified.

The invention has many advantages. It speeds up the identification of the transmission of a carrier in the transmission sequence provided according to a discontinuous transmission scheme. This improves the time for initial cell search being performed by mobile stations. This improvement may also be used for extending the time of silence in the scheme, which allows base stations to save energy.

According to one variation of the invention there may be provided a timing probability sequence associated with the transmission sequence, where the timing probability sequence comprises timing probability values reflecting transmission probabilities in various positions of the transmission sequence.

In this case the method would comprise the further steps of comparing the timing probability sequence with the part of the transmission sequence associated with the selected carrier, and updating the timing probability sequence based on the comparison. In addition to this the step of adjusting the probability settings of the carriers would be based on the updated timing probability sequence.

In this case the radio communication unit of the mobile station would be configured to compare the timing probability sequence with the part of the transmission sequence associated with the selected carrier and update the timing probability sequence based on the comparison. Here the adjusting of the probability settings of the carriers would be based on the updated timing probability sequence.

The radio communication unit may here be provided with a comparing unit for performing this comparison and updating of the timing probability sequence.

The timing probability sequence may be stored in a timing probability sequence store and data about the transmission sequence and probability settings stored in a carrier sequence store.

In this variation of the invention the computer program code of the computer program product may be further configured to make the mobile station compare the timing probability sequence with the part of the transmission sequence associated with the selected carrier and update the timing probability sequence based on the comparison. The adjusting of the probability settings of the carriers being performed by the radio communication unit would here be based on the updated timing probability sequence.

According to another variation of the invention each probability value of the timing probability sequence may correspond to a position in the transmission sequence.

In this case the step of comparing the timing probability sequence with a part of the transmission sequence in the method would comprise the further steps of comparing timing probability values with the active transmission interval of the selected carrier in the transmission sequence, changing the probability values having positions in the timing probability sequence corresponding to the position of the active transmission interval of the selected carrier in the transmission sequence and shifting either the known transmission sequence or the timing probability sequence. The carrier probability settings would then be adjusted based on the coincidence of high probability values in the timing probability sequence with the corresponding part of the transmission sequence occupied by the selected carrier.

In relation to this last variation it is also possible that the carrier probability settings are adjusted based on the amount of overlap between carrier position in transmission sequence and high probability values in the timing probability sequence. All probability values of the timing probability sequence may furthermore originally have the same assigned probability and the method may then further comprise the step of setting the probability values to zero in the timing probability sequence related to the part of the transmission sequence provided for the selected carrier.

According to the same variation the radio communication unit of the mobile station would be further configured to compare timing probability values with the active transmission interval of the selected carrier in the transmission sequence, change the probability values having positions in the timing probability sequence corresponding to the position of the active transmission interval of the selected carrier in the transmission sequence and shift either the known transmission sequence or the timing probability sequence. The adjusting of the carrier probability settings being performed by the radio communication unit would here be based on the coincidence of high probability values in the timing probability sequence with the corresponding part of the transmission sequence occupied by the selected carrier.

In relation to this last variation it is also possible that the carrier probability settings are adjusted based on the amount of overlap between carrier position in transmission sequence and high probability values in the timing probability sequence. All probability values of the timing probability sequence may furthermore originally have the same assigned probability and the radio communication unit may then be further configured to set the probability values to zero in the timing probability sequence related to the part of the transmission sequence provided for the selected carrier.

According to the same variation the computer program code of the computer program product may be further configured to make the mobile station compare timing probability values with the active transmission interval of the selected carrier in the transmission sequence, change the probability values having positions in the timing probability sequence corresponding to the position of the active transmission interval of the selected carrier in the transmission sequence and shift either the known transmission sequence or the timing probability sequence. The adjustment of the carrier probability settings would then be based on the coincidence of high probability values in the timing probability sequence with the corresponding part of the transmission sequence occupied by the selected carrier.

It is furthermore possible that the carrier probability settings are adjusted based on the amount of overlap between carrier position in transmission sequence and high probability values in the timing probability sequence. All probability values of the timing probability sequence may originally have the same assigned probability and the computer program code may be further configured to make the mobile station set the probability values to zero in the timing probability sequence related to the part of the transmission sequence provided for the selected carrier.

According to yet a further variation of the invention, the method includes the further steps of determining a fairness score for the carriers, setting the fairness score to zero for the selected carrier and increasing the fairness score for the other carriers. Here the step of selecting carrier is also based on the fairness score of the carriers.

According to the same variation of the invention the radio communication unit of the mobile station may be further configured to determine a fairness score for the carriers, set the fairness score to zero for the selected carrier and increase the fairness score for the other carriers, wherein the selection of carrier is also based on the fairness score of the carriers.

According to the same variation of the invention also the computer program code may cause the mobile station to determine a fairness score for the carriers, set the fairness score to zero for the selected carrier and increase the fairness score for the other carriers, wherein the selection of carrier is also based on the fairness score of the carriers.

The mobile station could have received knowledge of the transmission sequence of the discontinuous transmission scheme from the radio communication network. Alternatively the transmission sequence of the discontinuous transmission scheme could be a part of the communication standard of the network. It could also be provided to the mobile station via a SIM card or some other data carrier.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

Figure 1:
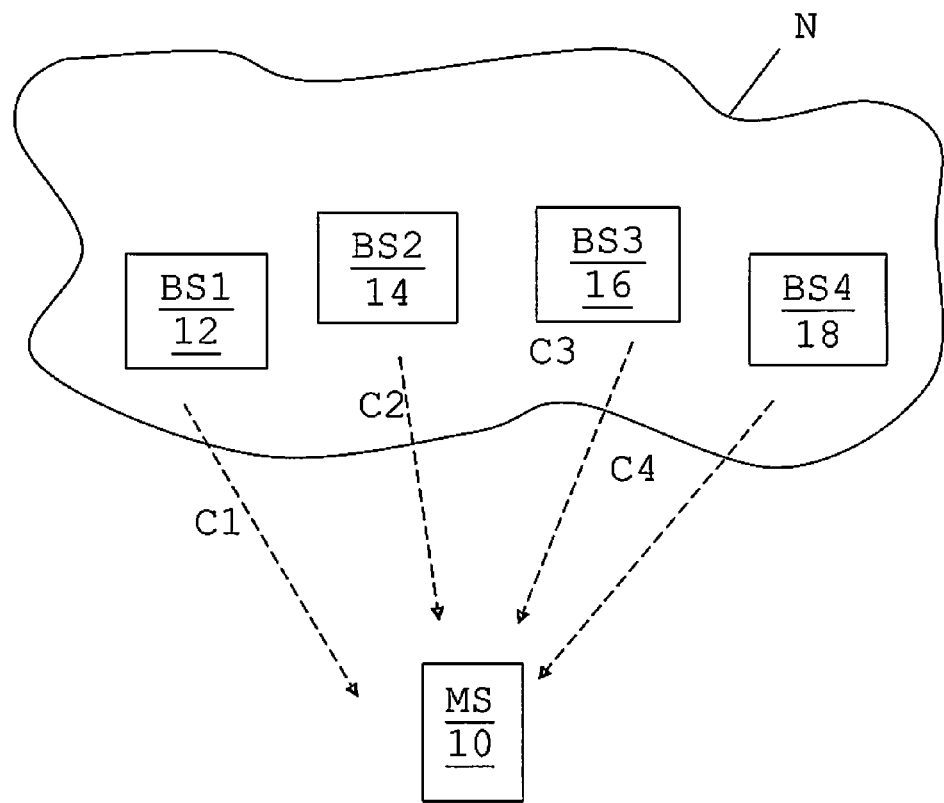
FIG. 1 schematically shows an access network of a wireless network including a number of base stations transmitting signals on a number of carriers and a mobile station that is within range of these carriers, FIG. 2 schematically shows the timing of a discontinuous transmission scheme according to a transmission sequence of the base stations and how these transmissions appear at the mobile station.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

In cellular systems of today, it is of interest for the cells or base stations to have longer periods of time when they are not transmitting.

This may for instance be done when there are no mobile stations requiring data traffic, which data traffic may include messaging, multimedia sessions and voice and video sessions as well as to save energy. Another reason why transmission may be performed more seldom is also that in these cases a radio circuit can be used a longer time without need to repair. The MTBF (Mean Time Between Failure) may thus be increased. This time of silence discussed here is typically longer than the radio frame, i.e. the format of normal radio transmissions.

However in order for a mobile station, often denoted user equipment (UE), to be able to actually find these cells or base stations, often denoted eNode B (eNB) in LTE, there has to be some logic in the way transmissions are made. These transmissions thus have to follow some kind of scheme, i.e. a discontinuous transmission mode or long DTX mode.

Because of this the base station may operate in a so-called silent or low activity mode, where the base stations are turned off for a fairly long period of time and turned on for a shorter time. This means that a base station may transmit for a cell in an active transmission period, where normal synchronisation signals and broadcast channels are provided, which is followed by an idle period where there are no transmissions.

This type of mode may therefore stipulate that the base station is not to perform downlink transmissions in a cell where there are no or very few active mobile terminals, except for intermittent transmissions of the signals necessary for active terminals in the proximity of the base station to find the idle cell. This is especially of interest where macro cells overlay micro cells. In case of low load idle terminals can camp on the macro cells and hence use their synchronisation symbols to be synchronized with the network.

As the network knows to which cells active terminals are connected, it is then straightforward to identity "empty" or very low load cells. Once a terminal moves into the area covered by the idle cell, the base stations needs to wake up and resume normal transmission as well as reception of signals. In order to determine if the base station should resume normal behaviour it may be necessary to detect if a terminal is moving into the idle cell. Such a terminal expects a certain signal, like synchronization signals, reference signals and broadcast channels, in order to be able to find the cell. Therefore despite being in low activity mode, the signals necessary for mobility are intermittently transmitted. The potential energy reduction is here approximately proportional to $Ta/(Tp+Ta)$, where $Ta$ is the duration of the active period and $Tp$ is the duration of the idle period.

The value of $Ta$ should be selected large enough for allowing the mobile terminal to find synchronisation signals with sufficiently high probability of success as well as being able to perform signal measurements on the cell. The time needed for this depends on the signal-to-noise ratio at the terminal, but if $Ta$ is in the order of 100 ms to 1 s, the probability of being unable to find the idle cell can be expected to be sufficiently low.

The value $Tp$ should be large enough to allow for a significant reduction in energy consumption. At the same time a too large $Ta$ means that terminals may not find the idle cell. A typical value of $Ta$ may be in the order to 1-10 s.

In order to enable a long DTX mode also for macro cells, it may be necessary to ensure that mobile stations are able to perform initial cell search and mobility measurements on cells in low activity mode. Initial cell search may here be performed through extending the original cell search procedure of the mobile station, where first normal cell search is performed, in which case the mobile station is only able to detect cells in normal operating mode. If this procedure fails, the mobile station may perform extended cell search in order to find cells in low activity mode. Since the base station is only performing intermittent transmissions, the mobile station will need to measure longer on each candidate frequency in order to detect these frequencies.

This extended cell search may in some cases lead to an exceptionally long cell search compared to a normal cell search.

One measure that may be implemented to quicken up such cell search is therefore to provide a transmission sequence in which the cells are transmitting, which simplifies the issue of identifying the cells if the mobile station knows this sequence.

Figures 2, 4:
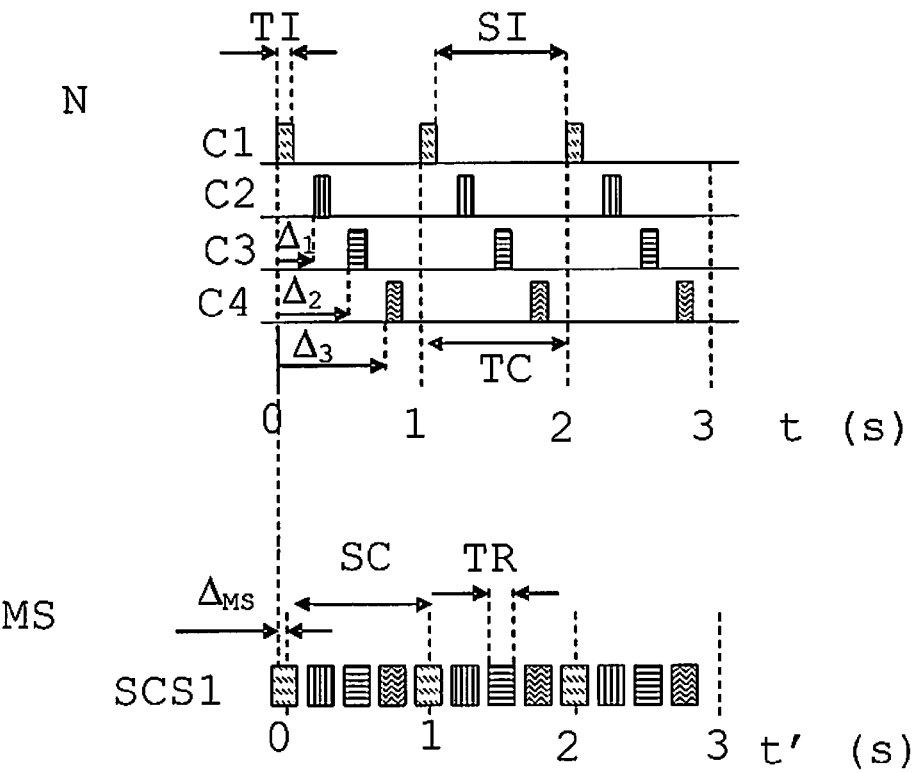

Such a situation is schematically disclosed by FIGS. 1 and 2,

FIG. 1 schematically shows a number of base stations 12, 14, 16, 18 in a part of a wireless network, where these base stations are transmitting in a long DTX mode or low activity mode in relation to a mobile station 10. The mobile station 10 is thus not active in receiving or sending data. Each base station furthermore transmits data on at least one carrier or frequency, where such data may be synchronisation data and broadcast data. A base station may cover more than one cell and it may therefore transmit on more than one carrier, where each such carrier may be assigned to a different cell.

There is thus a first base station BS1 12, a second base station BS2 14, a third base station BS3 16 and a fourth base station BS4 18 in an access network N of the wireless network. Here the first base station 12 transmits on a first carrier C1, the second base station 14 transmits on a second carrier C2, the third base station 16 transmits on a third carrier C3 and the fourth base station 18 transmits on a fourth carrier C4. These carriers here make up a set of carriers.

The mobile station is here within the range of these base stations and would be able to receive data on the carriers if it knew the structure in which they are transmitted.

The way transmissions could be structured is schematically shown in the upper part of FIG. 2. The carriers C1, C2, C3 and C4 of all the base stations following a discontinuous transmission scheme provided in a transmission cycle TC, having a certain length.

The discontinuous transmission scheme here specifies a transmission sequence TS of the carriers. This means that the transmissions follow each other in a certain order, which order may be specified in a standard. The transmission on each carrier is furthermore performed in a limited active transmission interval TI of this transmission cycle TC. This interval may be equal for all the different carriers. It should be realized that this is no requirement. The active transmission intervals TI may thus differ from each other. However, the active transmission intervals may have a common periodicity, i.e. they may have the same transmission cycle within which they operate. The different carriers may have one or more active transmissions intervals of arbitrary length(s) inside the transmission cycle. Each active transmission interval of a carrier is followed by a silence interval SI, where these two intervals together have the same length as the transmission cycle TC. One active transmission interval TI and one silence interval SI for a certain carrier is thus one transmission cycle long. As can be seen in FIG. 2, the beginning of an active transmission interval need furthermore not follow immediately after the end of a previous active transmission interval. There may thus be silence between active transmission intervals. It is also possible that the active transmission intervals of different carriers are provided directly after each other or that they may overlap each other. Also the transmission cycles may vary in length; they should however have one section that is common for all such cycles.

As can be seen in FIG. 2, there are shown three long transmission cycles TC of one second each, where a transmissions sequence TS is transmitted in each such transmission cycle. The cycle is here much longer than the ordinary frame length used in ordinary system transmissions, which could delay the detection of the carriers. This transmissions sequence is here exemplified as beginning with the transmission of the first carrier followed by the transmission of the second carrier. Then comes the third carrier C3 and finally the fourth carrier C4. The structure is furthermore known in the system, here indicated through the difference between the starting times of the active transmission interval TI of the transmission of the various carriers. There is here a first difference $\Delta_1$ between the starting time of the active transmission interval of the first carrier C1 and the starting time of the active transmission interval of the second carrier C2, a second difference $\Delta_2$ between the starting time of the active transmission interval of the second carrier C2 and the starting time of the active transmission interval of the third carrier C3 and finally a third difference $\Delta_3$ between the starting time of the active transmission interval of the third carrier C3 and the starting time of the active transmission interval of the fourth carrier C4.

However, even if the sequence and the starting times are known, the mobile station may still have difficulties in locating the transmissions on the carriers, because it is normally only able to listen to one carrier at a time. Furthermore, in case the timing of the mobile station is not synchronized with the timing of the network, which can be the case if for instance the mobile station has been turned off for a long time, then it may not know where the start and end of the transmission cycle is. It may thus be out of synchronisation.

This is indicated in the lower part of FIG. 2, where these is a difference $\Delta_{MS}$ between the timing of the mobile station and the timing of the network. This difference is shown as being small in FIG. 3, but if it is considerable the detection of the carriers and consequently the cell search time may become very long.

In the bottom part of FIG. 2 there is also shown that each carrier is scanned by the mobile station in a time range TR. This time range can be the same as the active transmission interval of the carrier, but it may also be shorter. Finally a scanning cycle SC is depicted. A scanning cycle is the scanning of all carriers, which is done by the mobile station as soon as it has detected the presence of the transmission sequence, which may not be so simple.

In view of this there is therefore a need to allow a mobile station to speed up the identification of cells or carriers even if the mobile station is heavily out of synchronisation with the network.

This is according to embodiments of the invention done through identifying the existence of a known transmission structure that the cells are using in a method and a mobile station according to the claims.

The present invention is generally directed towards simplifying the finding of a carrier by a mobile station. This method can speed up the identification when there is a long DTX scheme as the one described above. This may advantageously be performed at power on of the mobile station, because then the mobile station typically has no information of the network timing.

Figure 3:
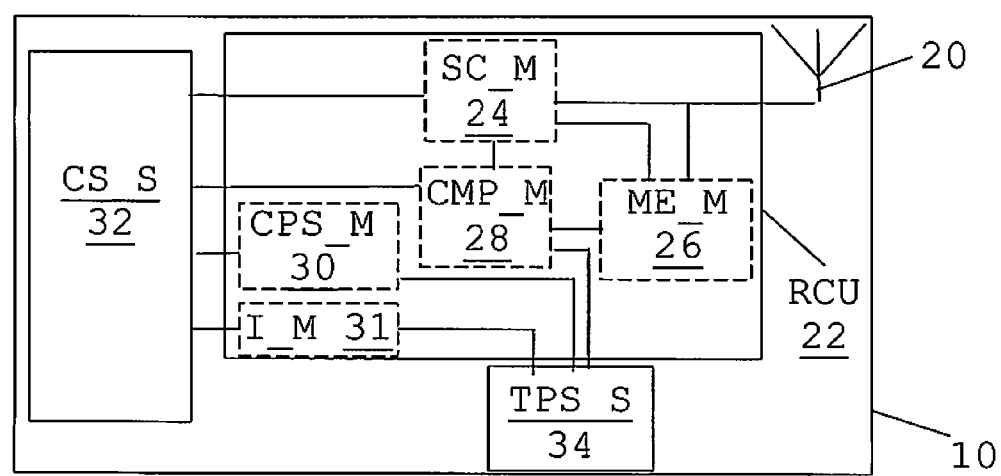
FIG. 3 shows a simplified block schematic of the mobile station, FIG. 4 schematically shows the content of a carrier transmission sequence store and a timing probability sequence store provided in the mobile station.

A simplified mobile station that is able to perform the functionality of the present invention is shown in FIG. 3. It should here be realised that a number of elements that are not necessary for understanding the present invention have been removed and that normally a mobile station is a much more complex device than the one shown in FIG. 3. In FIG. 3 there is thus shown a block schematic of a mobile station 10 according to one variation of the invention. The mobile station includes a radio communication unit 22 being connected to an antenna 20 as well as to a carrier sequence store CS_S and a timing probability sequence store TPS_S 34. The radio communication unit 22 according to this embodiment more particularly includes a scanning module SC_M 24 connected between the antenna 20 and the carrier sequence store 32, a measurement evaluating module ME_M 26 connected to the antenna 20, the scanning module 24 and a comparing module CMP_M 28. This comparing module 28 is in turn connected to the timing probability sequence store 34, the scanning module 24 and the carrier sequence store 32. There is also a carrier probability setting module CPS_M 30 connected between the carrier sequence store 32 and the timing probability sequence store 34. There is finally an initiating module I_M 31 connected to both the stores 32 and 34.

FIG. 4 schematically shows the principles by which content is stored in the carrier sequence store 32 and the timing probability sequence store 34. The carrier sequence store 32 includes data about the known transmissions sequence TS, which has here been divided between the different carriers as carrier sequences CS1, CS2, CS3 and CS4. There is thus here one carrier sequence CS1 for the first carrier, which is shown as transmitting at a first point in time P1, and then not transmitting at the times P2, P3 and P4. Transmission is here indicated with a T. These points of time are relative and the relationship to the actual transmission times used in the network unknown. There is in the same way provided a carrier sequence CS2 for the second carrier, which is shown as not transmitting at the first point in time P1, then transmitting at the second point in time P2 and again not transmitting at the third and fourth points in time P3 and P4. There is also provided a carrier sequence CS3 for the third carrier, which is shown as not transmitting at the first and second points in time P1 and P2, then as transmitting at the third point in time P3 and again not transmitting at the fourth point in time P4. There is furthermore a carrier sequence CS4 for the fourth carrier, which is shown as not transmitting at the first, second and third points in time P1, P2 and P3 and then as transmitting at the fourth point in time P4. Each of these carrier sequences are furthermore provided with a probability setting. The first carrier sequence CS1 or rather the first carrier is assigned a first probability setting $p_{C1}$, the second carrier sequence CS2 or rather the second carrier is assigned a second probability setting $p_C$, the third carrier sequence CS3 or rather the third carrier is assigned a third probability setting $P_{C3}$ and the fourth carrier sequence CS4 or rather the fourth carrier is assigned a fourth probability setting $P_{C4}$.

The content of the probability sequence store 34 also includes a sequence of probability values $p_1$, $p_2$, $p_3$ and $p_4$, which are provided at the same positions in time as the carrier transmission sequence. They thus have the same time spacing as the known carrier transmission sequence.

Figure 5:
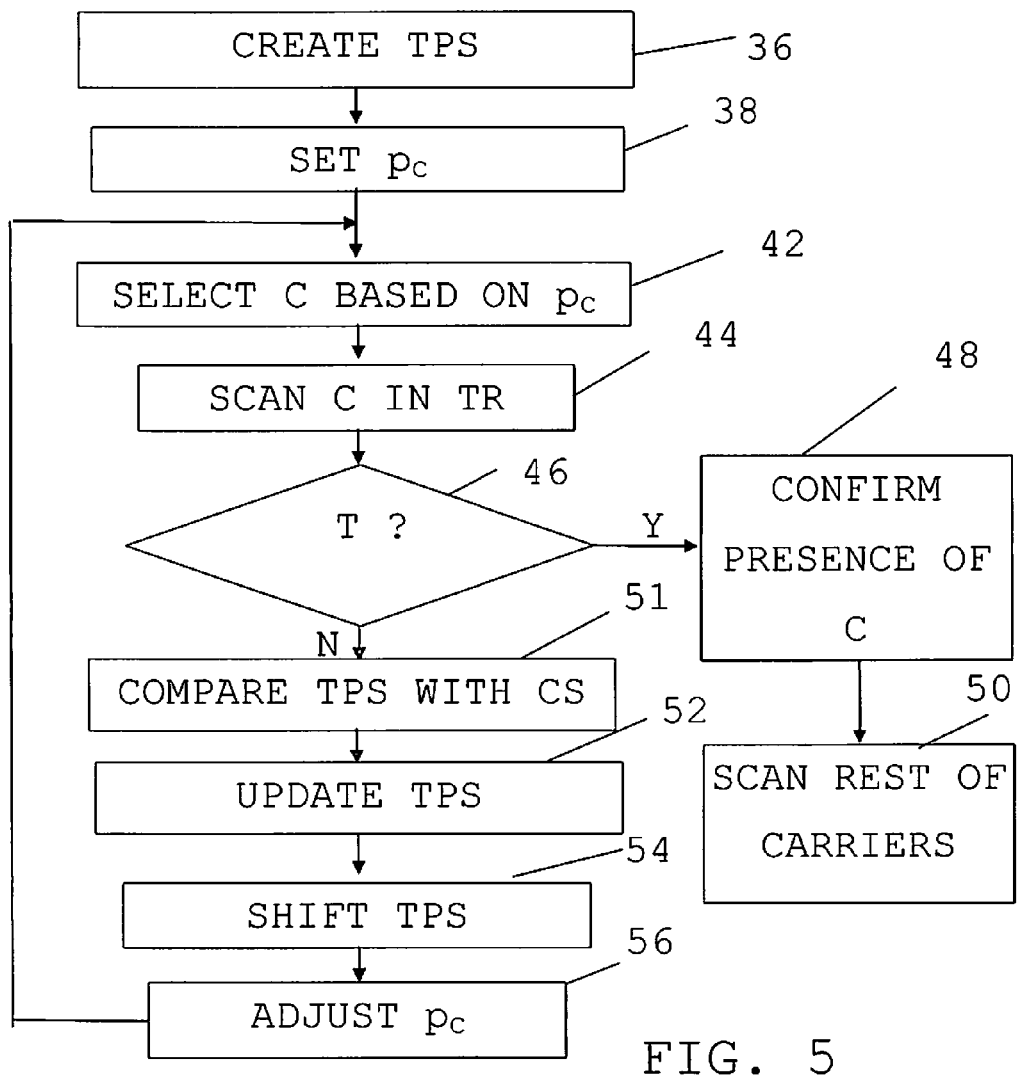
FIG. 5 shows a flow chart of a number of method steps being performed in a method for finding carriers being performed in the mobile station, FIG. 6 outlines an initialized carrier transmission sequence and an initialized timing probability sequence, FIG. 7 discloses an actual transmission sequence being displaced in time from the carrier sequence, FIG. 8 discloses the carrier transmission sequence and the timing probability sequence after a first scan with negative results, FIG. 9 discloses the carrier transmission sequence and the timing probability sequence after a second scan with negative results, FIG. 10 discloses the carrier transmission sequence and the timing probability sequence after a third scan with negative results, FIG. 11 FIG. 8 discloses the carrier transmission sequence and the timing probability sequence after a fourth scan with negative results, FIG. 12 discloses the carrier transmission sequence and the timing probability sequence after a fifth scan with negative results, and FIG. 13 schematically shows a computer program product according to an embodiment of the invention in the form of a CD ROM disc on which a computer program realizing the method of the invention is stored.

Now the functioning of the present invention according to a first embodiment of the invention will be described also with reference to FIG. 5, which shows a flow chart of an embodiment of the present invention being performed in the mobile station 10 and more particularly in the radio communication unit of the mobile station. The method is advantageously performed after power on of the mobile station, i.e. when it has no real knowledge of the timing used by the network, which network is furthermore also transmitting in long DTX mode.

The mobile station 10 is according to the invention operated for finding, for instance at power on, carriers on which transmissions are being made in a part of a radio communication network operating where the above described long DTX mode is used, which may thus be because of the base stations operating in an energy saving mode, where signals are transmitted on carriers C1, C2, C3, C4 in active transmission intervals of a transmission cycle TC, where the discontinuous transmission scheme specifies a transmission sequence TS of a set carriers and the active transmission intervals may have equal size.

As the method is started the initiating module 31 first creates the timing probability sequence TPS, step 36. It is here created such that it includes a number of positions that together represent the whole transmission sequence, i.e. the order and here also the relative time in which the transmissions of the carriers follow each other in the transmission cycle. This data is thus known by the mobile station. Each such position furthermore corresponds to a time range TR used for scanning a carrier. One position in the sequence can therefore be considered to correspond to a scanning step used when scanning a carrier. There are therefore created a number of probability values $p_1$, $p_2$, $p_3$ and $p_4$, where a probability value reflects the probability that a certain position of the transmission sequence coincides with a transmission on a carrier. This will be explained in more detail later. These probabilities are thus each assigned a value, which is here a value of one. Normally these values will either have a value of one or a value of zero. Thereafter the carriers are provided with probability settings $p_C$, step 38. This means that each carrier is assigned a probability setting, which probability setting is used for indicating the probability of the carrier being a carrier which a base station is currently transmitting on. In this initial stage the initiating unit 31 gives all the carriers the same probability setting, for instance the highest possible.

Thereafter the scanning module 24 selects a carrier based on the probability settings, step 42. Here it looks at the probability settings in the carrier transmission sequences store 32 and selects a carrier that has the highest probability setting. Since initially all carriers have the same setting, a random carrier may be selected. It is also possible that a specific carrier is always selected, for instance the first carrier of the sequence or one with the lowest frequency. Information about the selected carrier is also sent from the scanning module to the comparing module 28.

The scanning unit 24 then scans the selected carrier in a time range TR associated with this selected carrier, which is a fraction of the transmission sequence, step 44. It can be the whole active transmission interval within which the carrier is being transmitted according to the known sequence. It may also be only a part of this interval. A scan may with advantage be performed through signal strength measurements. The results of the scan in the form of measurements are then investigated concerning if they include transmissions T such as synchronisation signals. It is here possible that the signal strength is below a noise floor, i.e. that there is not enough measurable energy. It may then be possible to identify a transmission through using processing gain that is based on knowledge of a signal sequence being transmitted on the carrier. Therefore if such transmissions T are detected, step 46, then the presence of the carrier C is confirmed, step 48, by the measurement evaluating module 26. The results can then optionally be sent to the scanning module 24, which in turn may go on and scan the rest of the carriers according to the transmissions sequence, step 50, which can easily be done since the sequence is known and now also the absolute time of transmission cycle is known. In this way it is possible to locate a carrier on which transmissions are being made and optionally also to scan the rest of the carriers.

However, if no transmissions T were detected by the measurement evaluating module 26, step 46, this module informs the comparing module 28 of this fact. The comparing module then adjusts the probability settings of the carrier based on the timing of the scanning and the position of the carrier active transmission interval in the transmission sequence. This may in more detail be performed through fetching the carrier sequence CS of the selected carrier and the timing probability sequence TPS from the stores 32 and 34. The comparing module then compares the timing probability sequence with the part CS of the transmission sequence associated with the selected carrier, step 51. The comparison here involves comparing timing probability values with the active transmission interval of the selected carrier in the transmission sequence and changing the probability values having positions in the timing probability sequence corresponding to the position of the active transmission interval of the selected carrier in the transmission sequence. The comparison may more particularly involve comparing the probability values of the positions of the timing probability sequence with the positions of the carrier sequence CS that indicate a transmission. The timing probability sequence is then updated, step 52. This update is here performed through the probability values of the positions of the timing probability sequence which coincide with the positions of the carrier sequence CS that indicate a transmission are changed and in this embodiment changed from a high value to a low value if they did not already have a low value. In this embodiment this involves a change from one to zero. Thereafter the probability sequence is shifted, step 54. This shift is here made with a step size corresponding to the time range. The shift is in this example a shift to the right. The modified and shifted timing probability sequence is then stored in store 34 by the comparing module 28. Thereafter the carrier probability setting module 30 adjusts the probability settings of the carriers. This module 30 therefore fetches all the carrier sequences as well as the shifted timing probability sequence from the stores 32 and 34 and then compares all the carrier sequences of the carriers with the timing probability sequence. The carrier probabilities are then changed. This change is here performed through determining the amount of overlap between a part of a carrier sequence indicating a transmission and a part of the timing probability sequence having low probability values or zero probability values. In this way the carrier sequences are given adjusted probability settings. The updated probability settings are then stored in the store 32 by the module 30. After this the scanning unit 24 once again selects carrier based on probability setting, performs a scan, the results of which are measured and evaluated by the measurement evaluating unit, which confirms the presence of a carrier if there are transmissions and then the scanning unit scans the rest of the carriers and otherwise the carrier sequence of the selected carrier is once again compared with the timing probability sequence, the probabilities associated with the positions of the carrier sequence indicating a transmission changed, the timing probability sequence shifted and the carrier probability settings once again adjusted. The radio communication unit continues to operate in this way until a carrier has been confirmed to include transmissions.

As a carrier is identified, the mobile station can easily determine the correct network timing by camping on the cell transmitting the located carrier and thereafter also connect to a suitable base station in order to perform communication. The scanning scheme described above may provide considerable time savings compared with other types of scanning schemes.

The above-described method provided an increase in the speed with which a carrier is identified. This allows the mobile station to faster connect to the system. Alternatively this can be used for prolonging the time when transmissions are not made allowing further energy savings.

The transmission scheme was above described as being standardised. This is not necessarily so. The mobile station may obtain knowledge through other ways, for instance through reading information on a SIM card or through being properly programmed when being sold or serviced.

Another example will now be given of the invention for carrier sequences, shorter active transmission intervals, more carriers as well as combined with a fairness score.

Figures 6, 7:
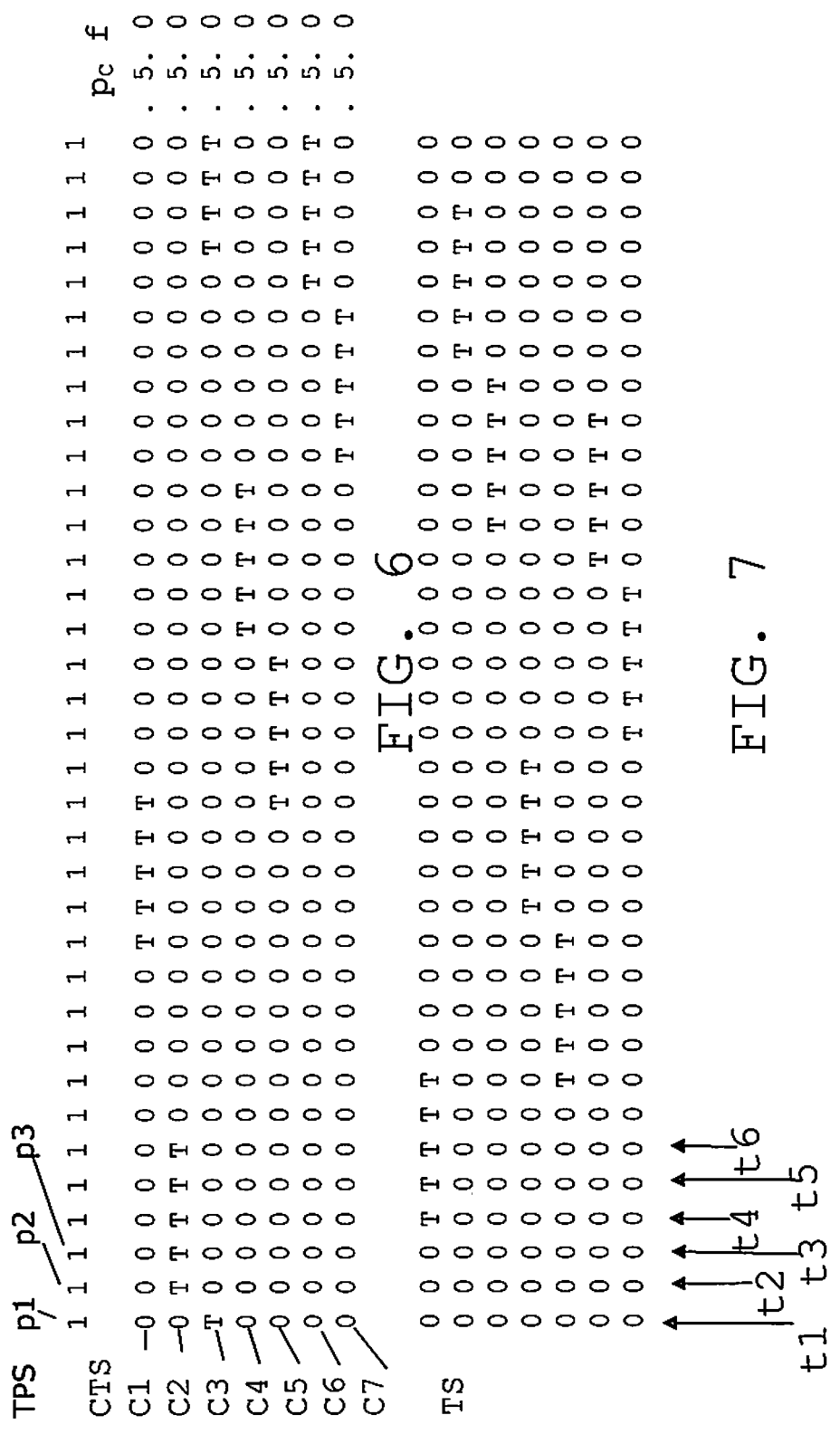

This example is here given with reference to FIGS. 6-12. The same modules and units of the mobile station will here be involved, why these will not be described in any further detail here. There is in this embodiment a previously undisclosed fairness score. This score is used by the scanning module in selecting carriers and set by the carrier probability setting module 30. Here FIG. 6 shows a timing probability sequence TPS comprising a number of probability values $p_1$, $p_2$, $p_3$ etc. There is also a carrier transmission sequence CTS, including a number of carrier sequences for seven different carriers C1-C7 having as many positions as there are timing probability values in the timing probability sequence TPS. These probability values can have the value of zero or one and initially they have the value of one, as is shown in FIG. 6. Each such position here corresponds to an active transmission interval within which scanning is performed. When transmission is made on a carrier in a certain position of a sequence this is here marked with a T, where no transmission is marked with a zero. As can be seen in the figure, each carrier is transmitted for five active transmission intervals. The carrier sequences are here all correct in that they correctly reflect the time differences between the transmissions of the carriers according to the transmission sequence used by the system. The carrier transmission sequence is thus the sequence the mobile station knows to be used by the system. With each carrier sequence there is also provided a probability setting $p_C$ and a fairness score f. The probability settings here reflect the amount of overlap between the transmissions and high probabilities of the timing probability sequence. Since the probability values of the timing probability sequence are all set to one, the probability settings $p_C$ all have the same highest value of 5, which indicates a maximum degree of overlap. The fairness score, which is an indicator of when the carrier was last selected for scanning is here set to zero for all carriers.

As mentioned earlier, the sequence has a time difference to the timing of the sequence being transmitted. This means that there is a time difference between when actual transmissions are being made and the knowledge of this sequence manifested in the carrier transmission sequence CTS. In FIG. 7 there is shown such a correctly timed sequence, of which the mobile station thus has no knowledge. As can be seen in this figure the actual transmissions on the first carrier are as an example performed prior to the transmissions according to the timing about to be used by the mobile station.

In FIG. 7 there are also shown a number of time instances in relation to the actual transmission scheme TS. There are thus points in time t1, t2, t3, t4, t5 and t6, where there are no transmission at all at the times t1-t3, while at the times t4-t6, transmissions are made on the first carrier. These points in time here correspond to the points in time when the mobile station starts to locate the transmission scheme TS.

Figures 8, 9:
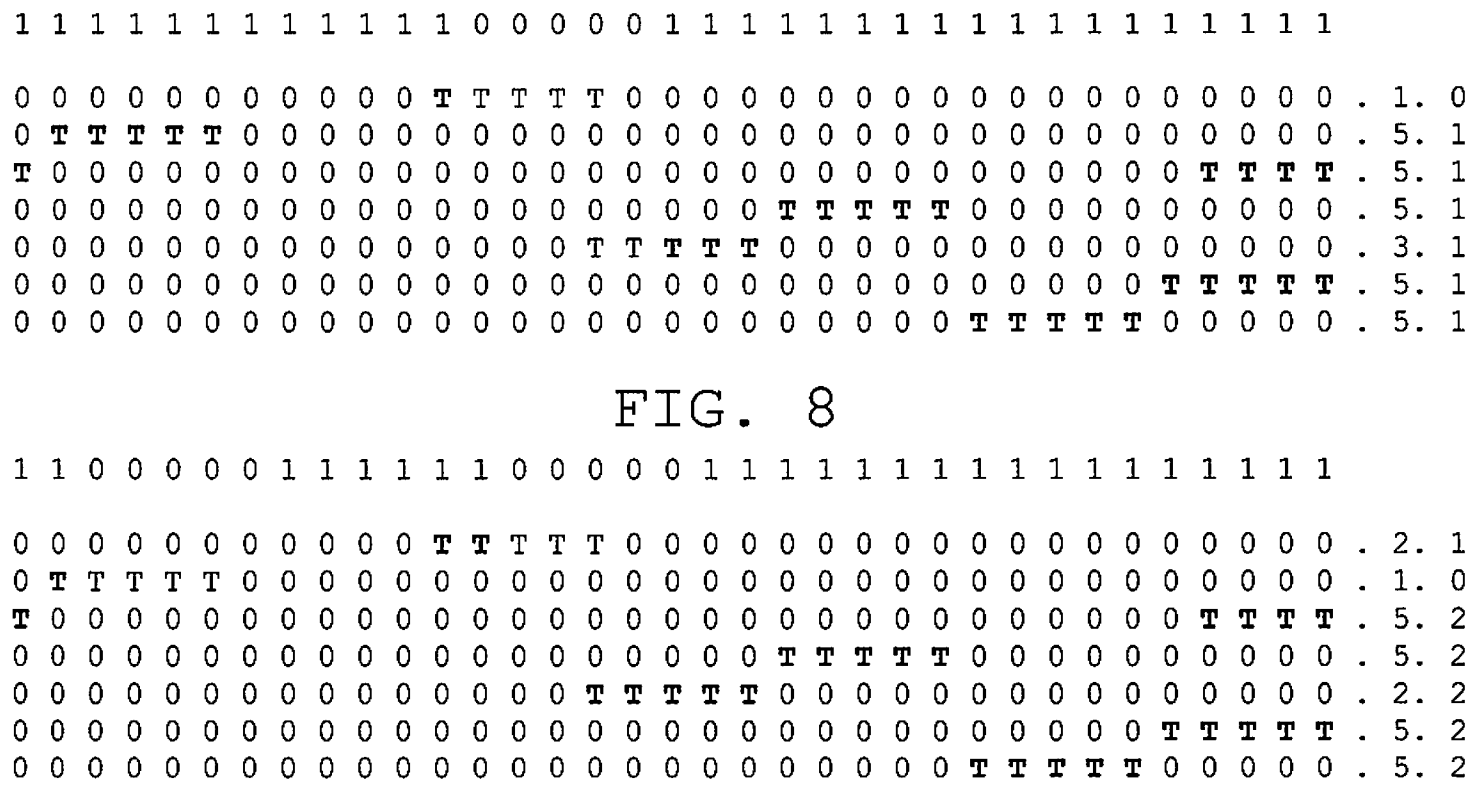

As is clear from the passages above, FIG. 6 shows the initialized probability values, probability settings and fairness scores. Therefore any carrier can now be selected to be scanned at a first point in time t1. As an example the first carrier C1 is selected. As can be seen in FIG. 7, this carrier does not transmit at this point in time, why the probability values of the timing probability section are adjusted. This adjusting thus involves a changing to zero of the probabilities that coincide with the positions when the first carrier is indicated as transmitting in the carrier sequence for C1. Thereafter the timing probability sequence TPS is shifted one step to the right in order to take account for one scan having been performed. Thereafter the probability settings of the carriers are updated. The results of this update are shown in FIG. 8. Here it can be seen that the probability setting of the first carrier is lowered to one, since the amount of overlap between high valued probability values (ones) of the timing probability sequence and transmissions of the carrier sequence is one out of five time ranges. It should here be noted that also the fifth carrier has some overlap. There are two transmission instances coinciding with zero valued probability values. Therefore also the probability setting of this carrier is lowered, here to a value of 3. The rest of the probability settings are not changed. The fairness score of the first carrier is reset to zero and the fairness scores of the other carriers are incremented so that now they have the score of one.

Thereafter a new carrier is selected to be scanned at the second point in time t2. From FIG. 8 it can be seen that the first and the fifth carrier are out of question. However it is possible to select any of the other carriers, since they have the same probability setting and the same fairness score. In this example the second carrier is selected, mainly because it should be the second according to the knowledge of the mobile station.

This second carrier is then scanned at the point in time t2. As can be seen in FIG. 7, there is no transmission on this carrier at this point in time either. Therefore the probabilities that coincide with the positions when the second carrier was presumed to be transmitting are changed, followed by a shift. Thereafter the probability settings of the carriers are adjusted, where the second carrier now receives the probability of one. Because of the shift the probability setting of the first carrier is incremented so now it has a value of two. Because of the shift the fifth carrier has its probability setting decreased even more, so now it also has a value of two. The other carriers retain their high probability settings. The carrier just scanned gets its fairness score reset to zero, while the fairness score of the other carriers are incremented. The results thus far are shown in FIG. 9.

Thereafter a new carrier is selected, here the third carrier. However, it should be known that any of the third, fourth, sixth or seventh carrier could have been selected because they have the same probability setting and the same fairness score as can be seen in FIG. 9. The third carrier may be selected merely because it has the lowest frequency or because it is the third carrier in the sequence. Thereafter a scan is performed on this carrier at the third point in time t3.

Figures 10, 11, 12:
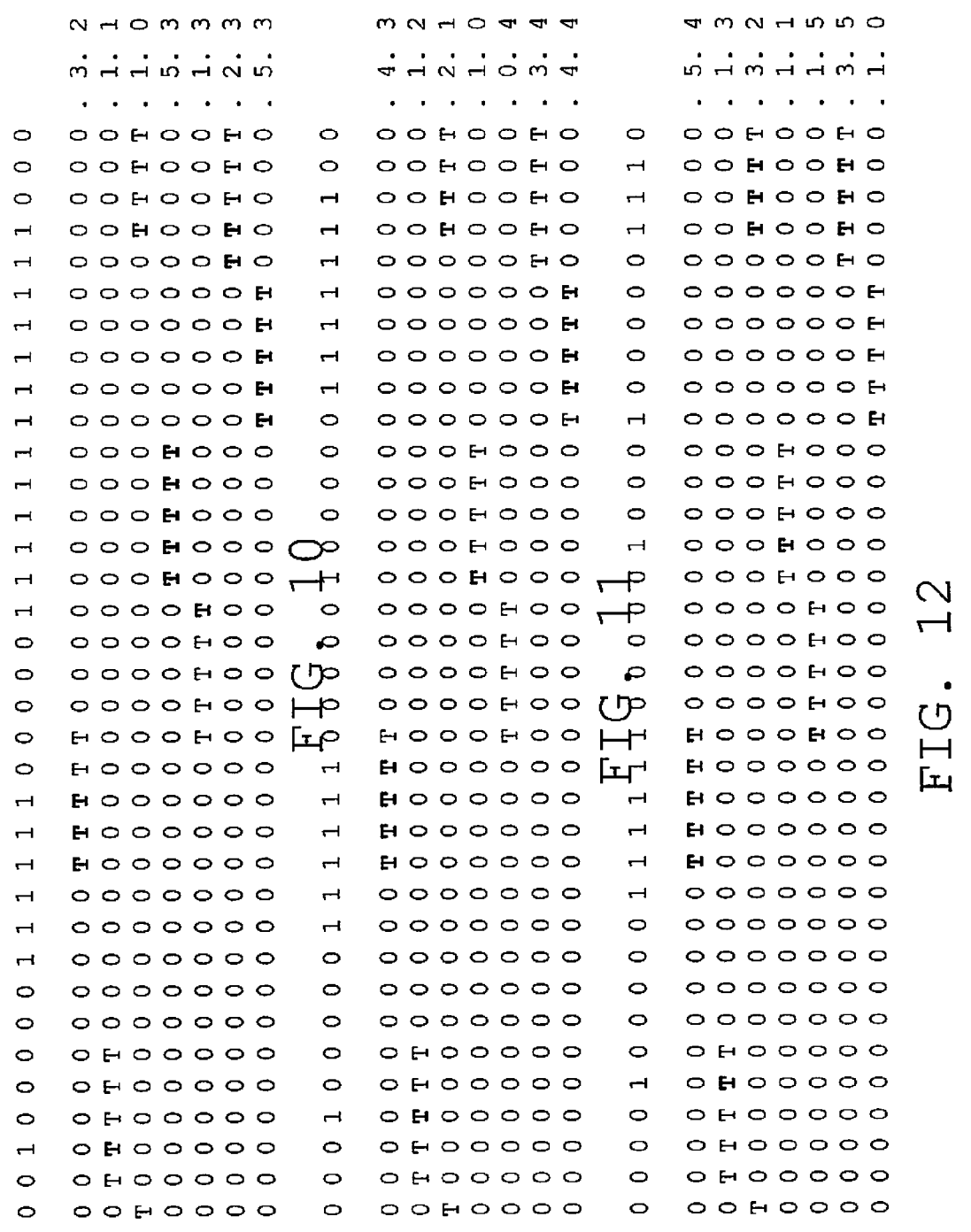

As can be seen in FIG. 7, there are no transmissions at this time either, why the probability values of the timing probability sequence coinciding with the transmission instances of the carrier sequence of the third carrier are set to zero. Thereafter follows a shift and a re-evaluation of the probability settings. As can be seen in FIG. 10, the fourth and the seventh carrier retain their probability settings; the third carrier has the probability setting reduced to one, which setting the second carrier retains. The first carrier has increased its probability setting to three, the fifth carrier has reduced the probability setting to one and the sixth carrier has now received a probability setting of two. The reason for the drastic change of the probability setting of the sixth carrier is because it has a substantial overlap with the third carrier. The fairness score of the third carrier has been reset to zero and the fairness score of the rest of the carriers increased by one.

As can be seen in FIG. 10 the next carrier has to be either the fourth or the seventh carrier since they both have the same and highest probability setting and the same fairness score. One of them may be randomly selected. In this example the fourth carrier is selected for the same reasons mentioned above.

Thus the fourth carrier is scanned at the fourth point in time t4, and as can be seen in FIG. 7, there is no transmission on this carrier at this point in time, why the probability values of the timing probability sequence coinciding with the transmission instances of the carrier sequence of the fourth carrier are also set to zero, followed by a shift. The situation after this shift is shown in FIG. 11.

The next selected carrier is the seventh. Here both the first and the seventh carrier have the same probability setting, a probability setting of four. However, the seventh carrier has a higher fairness score and therefore it gets selected. The scan that is then performed at the point in time t5 does likewise not result in the detection of the seventh carrier, since there are no transmissions there at this point in time as can be seen in FIG. 7. Therefore the probability values of the timing probability sequence coinciding with the transmission instances of the carrier sequence of the seventh carrier are set to zero, followed by the shift and an update of the carrier probability settings and fairness score. The results can be seen in FIG. 12. It is clear than now the first carrier has the highest probability setting, why it is selected. The carrier is then scanned at the sixth point in time t6. As can be seen in FIG. 7, there are transmissions on this carrier at this point in time and therefore the presence of a carrier is now finally confirmed.

There are possible variations that can be made of the invention. The shift need not be made on the timing probability sequence. It is possible to shift the carrier transmissions sequence instead, perhaps in the opposite direction. In the examples given above there were a finite number of time ranges, and the timing probability sequence included a number of values. However, it should be realized that the timing probability sequence could also be viewed as a continuous time span with a length corresponding to the transmission cycle and the unknown time difference to the timing of the transmission sequence may therefore not be limited to being an integer multiple of the time range.

Figure 13:
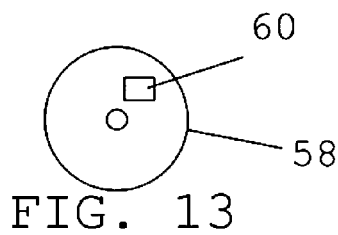

The radio communication unit may with advantage be provided in the form of a processor with associated program memory including computer program code for performing the functionality of a radio communication unit. It should be realized that this unit may also be provided in the form of hardware, like for instance in the form of an ASIC circuit. The invention may also be provided as software. This means that the invention may be provided as computer program code which when run in a processor in a mobile station, causes the mobile station to perform the functionality of a radio communication unit. This program code could furthermore be provided on a data carrier, like a CD ROM disc or a memory stick, which will implement the above described functionality when being loaded into a mobile station. One such computer program product in the form of a CD ROM disc 58 on which such computer program code 60 is stored is schematically shown in FIG. 13.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method, in a mobile station, for finding carriers on which transmissions are being made in a part of a radio communication network, the method comprising:

selecting a carrier in a set of carriers of a discontinuous transmission scheme where signals are transmitted on the carriers of the set in active transmission intervals of a transmission cycle, said discontinuous transmission scheme specifying a transmission sequence of said set of carriers, and wherein said selecting is based on probability settings provided for the carriers of the set;

scanning the selected carrier during a time range that is a fraction of the transmission cycle;

confirming the presence of the selected carrier if transmissions are detected and otherwise (a) adjusting the probability settings of the carriers of the set, based on a timing of the scanning and a position of the selected carrier's active transmission interval in the transmission sequence, and (b) repeating the selection of a carrier based on the adjusted probability settings and repeating the adjusting of probability settings until the presence of a carrier has been confirmed.

2. The method of claim 1, wherein there is a timing probability sequence associated with the transmission sequence, said timing probability sequence comprising timing probability values reflecting transmission probabilities in various positions of the transmission sequence, the method further comprising:

comparing the timing probability sequence with the part of the transmission sequence associated with the selected carrier; and updating the timing probability sequence based on the comparison;

wherein said step of adjusting the probability settings of the carriers is based on the updated timing probability sequence.

3. The method of claim 2, wherein the probability values of the timing probability sequence correspond to a position in the transmission sequence, and wherein comparing the timing probability sequence with a part of the transmission sequence comprises:

comparing timing probability values with the active transmission interval of the selected carrier in the transmission sequence;

changing the probability values having positions in the timing probability sequence corresponding to the position of the active transmission interval of the selected carrier in the transmission sequence; and shifting either the known transmission sequence or the timing probability sequence;

wherein the step of adjusting the probability settings is based on the coincidence of high probability values in the timing probability sequence with the corresponding part of the transmission sequence occupied by the selected carrier.

4. The method of claim 3, wherein the carrier probability settings are adjusted based on the amount of overlap between carrier position in transmission sequence and high probability values in timing probability sequence.

5. The method of claim 2, wherein all probability values of the timing probability sequence originally have the same assigned probability, the method further comprising setting said probability values to zero in the timing probability sequence related to the part of the transmission sequence provided for the selected carrier.

6. The method of claim 1, further comprising determining a fairness score for the carriers, setting the fairness score to zero for the selected carrier, and increasing the fairness score for the other carriers, wherein the step of selecting the carrier is also based on the fairness score of the carriers.

7. The method of claim 1, wherein knowledge of the transmission sequence of the discontinuous transmission scheme has been received from the radio communication network.

8. The method of claim 1, wherein the transmission sequence of the discontinuous transmission scheme is a part of the communication standard of the network.

9. A mobile station for finding carriers on which transmissions are being made in a part of a radio communication network, the mobile station comprising at least one radio communication unit for communicating with the network, wherein the radio communication unit is configured to:

select a carrier in a set of carriers of a discontinuous transmission scheme where signals are transmitted on the carriers of the set in active transmission intervals of a transmission cycle, said discontinuous transmission scheme specifying a transmission sequence of said set of carriers, said selecting being based on probability settings provided for the carriers of the set;

scan the selected carrier during a time range that is a fraction of the transmission cycle; and confirm the presence of the selected carrier if transmissions are detected and otherwise (a) adjust the probability settings of the carriers of the set, based on a timing of the scanning and a position of the selected carrier's active transmission interval in the transmission sequence, and (b) repeat the selection of a carrier based on the adjusted probability settings and repeat the adjusting of probability settings until the presence of a carrier has been confirmed.

10. The mobile station of claim 9, wherein there is a timing probability sequence associated with the transmission sequence, said timing probability sequence comprising timing probability values reflecting transmission probabilities in various positions of the transmission sequence, and wherein the radio communication unit is further configured to:

compare the timing probability sequence with the part of the transmission sequence associated with the selected carrier;

update the timing probability sequence based on the comparison; and base the adjustment of the probability settings of the carriers on the updated timing probability sequence.

11. The mobile station of claim 10, wherein each probability value of the timing probability sequence corresponds to a position in the transmission sequence, and wherein the radio communication unit is further configured to:

compare timing probability values with the active transmission interval of the selected carrier in the transmission sequence;

change the probability values having positions in the timing probability sequence corresponding to the position of the active transmission interval of the selected carrier in the transmission sequence;

shift either the known transmission sequence or the timing probability sequence; and base the adjustment of the probability settings of the carriers on the coincidence of high probability values in the timing probability sequence with the corresponding part of the transmission sequence occupied by the selected carrier.

12. The mobile station of claim 11, wherein the radio communication unit of the mobile station is further configured to base the adjustment of the carrier probability settings on the amount of overlap between carrier position in transmission sequence and high probability values in timing probability sequence.

13. The mobile station of claim 9, wherein the radio communication unit is further configured to determine a fairness score for the carriers, set the fairness score to zero for the selected carrier and increase the fairness score for the other carriers, wherein the selection of carrier is also based on the fairness score of the carriers.

14. The mobile station of claim 9, where the radio communication unit comprises a scanning module for selecting carrier, a measurement evaluation module for detecting transmissions and a carrier probability setting module for adjusting the probability settings of the carriers.

15. A computer program product for making a mobile station find carriers on which transmissions are being made in a part of a radio communication network, the computer program product comprising a non-transitory computer-readable medium comprising computer program code stored thereon, which computer program code, when run in the mobile station, causes the mobile station to:

select a carrier in a set of carriers of a discontinuous transmission scheme where signals are transmitted on the carriers of the set in active transmission intervals of a transmission cycle, said discontinuous transmission scheme specifying a transmission sequence of said set of carriers, said selecting being based on probability settings provided for the carriers of the set;

scan the selected carrier during a time range that is a fraction of the transmission cycle;

confirm the presence of the selected carrier if transmissions are detected and otherwise (a) adjust the probability settings of the carriers of the set, based on a timing of the scanning and a position of the selected carrier's active transmission interval in the transmission sequence, and (b) repeat the selection of a carrier based on the adjusted probability settings and repeat the adjusting of the probability settings until the presence of a carrier has been confirmed.

* * * * *